United States Patent [19]

Sano et al.

[11] 4,307,126

[45] Dec. 22, 1981

[54] METHOD OF PRODUCING FRUIT-CONTAINING CHOCOLATE

[75] Inventors: Michiyasu Sano; Tsuguo Kimura, both of Yokohama, Japan

[73] Assignee: Morinaga & Company, Limited, Tokyo, Japan

[21] Appl. No.: 137,807

[22] Filed: Apr. 4, 1980

[30] Foreign Application Priority Data

Dec. 11, 1979 [JP] Japan ................................. 54-159817

[51] Int. Cl.³ .............................................. A23G 1/00
[52] U.S. Cl. ..................................... 426/660; 426/518
[58] Field of Search ............... 426/660, 640, 631, 524, 426/615, 616, 518, 103, 613; 241/23, 17

[56] References Cited

U.S. PATENT DOCUMENTS

| | | | |
|---|---|---|---|
| 2,082,312 | 6/1937 | Todd .................................. | 426/660 |
| 2,836,368 | 5/1959 | McCoy ............................... | 426/524 |
| 3,542,270 | 11/1970 | Schubiger et al. ................. | 426/660 |
| 3,554,766 | 1/1971 | Engel et al. ........................ | 426/660 |

OTHER PUBLICATIONS

Roth, *Old-Fashioned Candymaking*, p. 36, 1974.

*Primary Examiner*—Joseph M. Golian
*Assistant Examiner*—George C. Yeung
*Attorney, Agent, or Firm*—Oblon, Fisher, Spivak, McClelland & Maier

[57] ABSTRACT

A fruit chocolate containing at least one kind of dried or candied fruit in the form of uniformly dispersed fine particles is produced by freezing the dried or candied fruit together with at least one kind of edible oil or fat, or foodstuff containing oil or fat, finely pulverizing this frozen mixture and dispersing the resultant fine particles in a chocolate base to form a fruit-containing chocolate paste. The presence of oil or fat prevents the fine fruit particles from forming sticky agglomerates, so that a sufficient amount of dried or candied fruit can be incorporated into the chocolate to provide both the strong taste and aroma of the fruit and good sweetness, even when the chocolate contains neither sugar nor a sugar substitute.

11 Claims, No Drawings

METHOD OF PRODUCING FRUIT-CONTAINING CHOCOLATE

BACKGROUND OF THE INVENTION

Producing a genuine fruit chocolate has been a matter of great concern in the field of confections. However, addition of a fresh fruit, which is a very watery material to chocolate has been proved to be impracticable since the two components hardly combine with each other. In such products prepared prior to the present invention only a very limited amount of fresh fruit is incorporated in chocolate. However the resulting "fruit chocolate" lacked the taste and odor of the incorporated fruit. Therefore, fruity flavorings have generally been utilized to produce fruit-flavored chocolates. The products containing such flavorings have the odor of a fruit but lack the requisite taste of the fruit.

Naturally it has been conceived to combine dried fruit or candied fruit with chocolate, thereby increasing the fruit-to-chocolate proportion to a level sufficient to provide the product with a fruit taste. Examples of conventional chocolate products based on this concept are chocolate-coated dry fruits and a class of fruit chocolates produced by molding a chocolate paste which contains grains or crushed pieces of a dried fruit dispersed therein. In these chocolate products, however, the presence of the grains or crushed pieces of dry fruit is perceptible as a feeling of physical variance with the smoothness of chocolate itself on the tongue. Due to this disadvantageous texture, products of this type have not been commercially successful.

It is desirable therefore, to overcome the aforementioned problem that a dehydrated fruit be uniformly mixed with or dispersed in a chocolate base. Hitherto, however, this has been very difficult to accomplish for the following reasons.

Dried fruits and candied fruits are of course lower in water content than fresh or raw fruits, but they still contain considerably large amounts of water in comparison with chocolate. In addition, they contain saccharides, polysaccharides and pectic substances which make them sticky. Therefore, when a dehydrated fruit or crushed pieces thereof are added to chocolate base at the stage of adding other ingredients during a conventional sweet chocolate manufacturing process, the resulting mixture is difficult to blend into a dough-like consistency. Even in the event a dough-like state can be produced, further refining of the dough-like mixture by roll refiners causes the dehydrated fruit to be squeezed, resulting in the formation of a sticky jelly-like phase. With the formation of the jelly-like phase other ingredients such as powdered milk, form sticky agglomerates which are very difficult to reduce in size. This causes further refining to be virtually impossible. Even if refining can be achieved by greatly decreasing the proportion of dehydrated fruit to chocolate, there is a further problem that the succeeding conching process becomes impracticable. During conching, the pieces of dehydrated fruit in the chocolate paste adhere to one another, incorporate hydrophilic materials such as sugar and powdered mild and/or absorb moisture, with the result that grains or coarse particles are formed in the paste. If the conching process is further continued, these grains or coarse particles agglomerate into larger masses, which tend to separate from the fat in the paste and solidify in the conching apparatus, which can damage the apparatus.

Another attempt to solve the problem of how to effectively incorporate fruit into a chocolate confectionary involved initially pulverizing dehydrated fruit and mixing it with the chocolate base in such small particles that the resulting fruit chocolate may not offer a feeling of physical variance on the tongue. However, such pulverization of any dehydrated fruit is virtually impossible by means of a conventional mill because of sticking of crushed pieces of the fruit to mill parts such as blades. Even if the pulverization is forcibly accomplished, the result is the formation of agglomerates of a sticky paste-like or jelly-like substance which cannot be uniformly dispersed in a chocolate paste.

It is known that a material which exhibits stickiness at room temperature may be pulverized in frozen state. Dehydrated fruits can be pulverized by this technique, but the pulverized fruits remain in the form of small particles only while they are in the frozen state. As the temperature of the particles rises to room temperature or above, the particles soften and begin to adhere to one another finally turning into sticky or jelly-like agglomerates of considerably large size. Therefore, it has been impossible to disperse a dehydrated or freeze-pulverized dehydrated fruit in a chocolate paste in finely pulverized form.

SUMMARY OF THE INVENTION

It is a principal object of the present invention to provide a novel method of producing a fruit-containing chocolate which contains at least one kind of dehydrated fruit in finely pulverized form substantially uniformly dispersed therein in such large amount that the product possesses the strong taste and odor of the contained fruit.

It is a further object of the invention to provide a fruit chocolate having the strong odor and taste of the fruit and an acceptable sweetness yet which contains little or no refined sugar and may be termed a "diet chocolate." By "refined sugar" is meant not only powdered sugar as conventionally utilized in chocolate manufacture but other forms of sugar such as granulated sugar and crystalline sugar.

It is still another object of the invention to provide a fruit chocolate which is of the aforesaid type and which contains no sweeteners other than the dehydrated fruit, so that such chocolate is a natural food rich in natural sweetness given only by the incorporated fruit.

DETAILED DESCRIPTION OF THE INVENTION

According to the present invention, a fruit-containing chocolate is produced by a process comprising mixing at least one kind of dehydrated fruit selected from dried fruits and candied fruits with at least one kind of edible oil or fat, or oil- or fat-containing foodstuff; freezing the resulting mixture at a sufficiently low temperature so that the mixture may be pulverized; pulverizing the frozen mixture into fine particles; and mixing the obtained fine particles with a chocolate base thereby preparing a chocolate paste which contains the fine fruit particles in substantially uniformly dispersed state.

In accordance with the invention, the terminology "oil- or fat-containing foodstuffs" means an edible oil or fat or foodstuffs containing an oil or fat which can be incorporated into chocolate without adversely affecting the taste of chocolate.

The chocolate paste produced by a method of the invention can readily be molded into fruit-containing chocolate products of desired shapes or coated on various centers.

When two or more kinds of dehydrated fruits are jointly utilized in the present invention, it is optional to choose either to freze-pulverize a mixture of all kinds of dehydrated fruits or to individually freeze-pulverize each kind of dehydrated fruit and mix the fine particles of all kinds of dehydrated fruits during the step of mixing the fine particles with a chocolate base.

The primary feature of the present invention is to obtain fine particles of at least one kind of dehydrated fruit, i.e. dried fruit or candied fruit by freezing the dehydrated fruit in the presence of at least one kind of oil- or fat-containing foodstuff and then pulverizing the frozen mixture. We have discovered that pulverization of dehydrated fruits into fine particles can easily be achieved by this novel technique and that, even at room temperature or higher temperatures experienced during manufacturing of chocolate, dehydrated fruits pulverized by this technique remain in the form of fine particles without the individual particles sticking to one another. This is because the oil or fat existing in the fruit powder prevents the fruit particles from coming into intimate contact with one another. Accordingly this fruit powder does not turn into sticky and/or jelly-like aglomerates and, therefore, can be uniformly dispersed in a chocolate base.

Owing to such advantageous properites of the oil- or fat-containing fruit powder, the method of the invention allows the addition of a considerably large amount of dehydrated fruit to chocolate and gives genuine fruit-containing chocolates which are distinctly stronger in fruity taste than conventional fruit chocolates. Moreover, the products of this method, that is, chocolates containing dehydrated fruit in the form of finely pulverized and uniformly dispersed particles, do not have an unfavorable feeling of physical variance to the tongue: like ordinary sweet chocolates they are very smooth and nice in the consumers' mouth.

A further advantage to the products of the invention is that they provide improved sweetness to sugarless chocolates or so-called diet chocolates which are intended for those who dislike the intake of refined sugar for the reason of health, beauty or nutrition. Generally, diet chocolates utilize a substitute sugar, such as sorbitol, as a sweetener in place of refined sugar. Conventional diet chocolates of this category are generally insufficient in sweetness and inferior in the quality of sweetness to refined sugar-containing chocolates. However, sugarless diet chocolates produced by a method of the present invention can be greatly improved in both the intensity and quality of sweetness by the incorporation of a sufficiently large amount of dehydrated fruit.

Furthermore, one of the most remarkable effects of the present invention is that sweet chocolates can be prepared utilizing no sugar, sugar substitutes or noncaloric sweeteners. The products are sweetened exclusively by the natural sweetness of at least one kind of dehydrated fruit. If is possible in accordance with the present invention to increase the amount of dehydrated fruit to such an extent that the produced chocolate becomes sufficiently sweet to the mouth without the aid of any extra sweetener. Thus, this method can provide fruit chocolates which are completely free of refined sugar or the like and hence are an excellent natural food.

DESCRIPTION OF THE PREFERRED EMBODIMENTS

Examples of dehydrated fruits useful in the present invention are dried apple, dried banana, dried date, dried fig, dried persimmon, prune, sultana raisin and other raisins, and various candied fruits such as candied citrus fruits, flesh and/or rind, such as, for example, orange and lemon, candied apple, candied pineapple and candied cherry. It is suitable to use dehydrated fruits which have been dried (either by sun-drying or by artificial drying) to have a water content not higher than 35%, preferably not higher than 25%. It is optional either to use only one kind of dehydrated fruit or to choose a combination of two or more kinds of dehydrated fruits. In the case of producing either a diet chocolate or a chocolate that can be called natural food, it is preferred to avoid the use of candied fruit and choose instead dried fruit which is strong in sweetness, such as dried apple, dried date and/or raisins.

The fruit-containing chocolate of the invention contains one or more oil- or fat-containing foodstuffs, having an oil or fat content sufficient to prevent fine particles of the freeze-pulverized dehydrated fruit from sticking to one another after thawing of the frozen dehydrated fruit. Taking into consideration the effect of such substances on the taste of chocolate, it is preferable to use edible seeds and nuts such as almond, cacao beans, cashew nut, hazel nut and/or peanut. Additional preferred oil- or fat-containing foodstuffs are butter fat or a nut paste produced by grinding any of these nuts and seeds, such as almond paste, cacao mass or peanut butter. Particularly preferred are cacao nibs or cacao mass produced by grinding cacao nibs as these substances have no adverse effect on the taste of chocolate.

It is important to avoid using an oil- or fat-containing foodstuff that has an adverse effect on the physical properties of chocolate. More particularly, any oil or fat or foodstuff containing the same which does not solidify or produces bloom during shaping of chocolate products is undesirable. However, the chocolate preparations of the invention may also contain a non-solid fat so long as the amount utilized is relatively small.

The proportion of the oil- or fat-containing foodstuff to dehydrated fruit should be determined with consideration of various factors including the content of non-sticky substances such as protein and fiber in the foodstuff and water content of the dehydrated fruit. It is necessary that the amount of oil or fat is sufficient to prevent sticking of fine particles of dehydrated fruit obtained by freeze-pulverizing, and accordingly, in accordance with the invention an amount of oil- or fat-containing foodstuff such that the fine particles of dehydrated fruit contain at least 10% by weight of oil or fat.

In accordance with the invention, freezing of the dehydrated fruit containing at least one kind of oil- or fat-containing foodstuff, and pulverizing of the frozen material are accomplished at temperatures low enough to freeze-solidify the dehydrated fruit and provide it with such a level of hardness sufficient for a pulverizing operation. Preferably, the freezing and pulverizing are carried out at temperatures below about $-25°$ C., and more preferably below about $-40°$ C.

The dehydrated fruit in the frozen state is pulverized to such extent that the resulting fine particles do not offer a feeling of physical variance to the tongue when chocolates produced by a method of the invention are eaten. From this point of view, usually it is desirable to carry out the pulverization so as to obtain fine particles which pass through a 100-mesh screen (ASTM standard) and more preferably will pass through a 160 mesh screen or a 200 mesh screen.

Prior to freeze-pulverizing the mixture of dehydrated fruit and oil- or fat-containing foodstuff, an emulsifying agent and/or other conventional ingredients of chocolate preparations may optionally be added to the dehydrated fruit.

Then the fine particles of dehydrated fruit are mixed with a chocolate base so as to give a chocolate paste in which the fine particles are uniformly dispersed.

A chocolate base for use in a method of the invention is composed of conventional raw materials for chocolate but does not contain any fruit. Such a base may, for example, be comprised of a milk chocolate base prepared by adding sugar, powdered milk, cocoa butter and other conventional ingredients to cacao mass or chocolate liquor, followed by grinding for the purpose of refining and, if necessary, conching. As described hereinbefore, sugar, i.e. sucrose in such chocolate base may be replaced by any substitute sugar or noncaloric sweetener, or a chocolate base containing no sweetener may be used. In any case, the composition of a chocolate base in the method of the invention should be determined with consideration of the quantity of oil or fat contained in the foodstuff(s) added to dehydrated fruit to be pulverized and mixed with the chocolate base.

The mixing ratio of finely pulverized dehydrated fruit to chocolate base can vary within a very wide range. However, when it is intended to mold the resultant fruit-containing chocolate paste into bars, plates or blocks, it is desirable that the amount of the dehydrated fruit not exceed 50% by weight of the fruit-containing chocolate paste since the existence of a larger amount of dehydrated fruit makes the shaping process difficult. To afford the product with a sufficiently strong taste of fruit, it is desirable that the amount of dehydrated fruit in the chocolate paste is at least 5% calculated on the basis of the weight of the fruit in the raw state, i.e. before it is dehydrated.

The mixing of fine particles of dehydrated fruit with a chocolate base is carried out by melting the chocolate base and adding the fine particles with stirring until the fine particles are uniformly dispersed in the chocolate. The stirring should be done as gently as possible because excessively vigorous stirring will increase the chance of the fine particles coming into intimate contact with one another, possibly with the result that the particles will stick to one another to form agglomerated grains.

After completion of this mixing operation, the resultant fruit-containing chocolate paste is subjected to shaping into desired fruit chocolate products.

In a manner similar to conventional chocolate pastes, the fruit-containing chocolate paste prepared according to the invention can be shaped into bars, plates and blocks by pouring, after tempering of the paste, into molds or by coating on desired centers, and subjecting to cooling for solidification. Alternatively, the mixing of the fine particles of dehydrated fruit with a chocolate base may be preceded by tempering of the chocolate base alone. It is within the scope of the invention to incorporate granular foodstuff such as nuts or puffed cereal products into the fruit-containing chocolate paste.

The following examples are presented to illustrate the present invention and should be no means be construed as limiting the scope thereof. Throughout these examples, the amounts of the ingredients are shown by parts by weight.

EXAMPLE 1

At first, 57 parts of candied orange was mixed with 19 parts of hard butter, 19 parts of powdered whole milk, 4 parts of powdered skim milk and 1 part of lecithin. The resulting mixture was frozen and then pulverized in the frozen state into fine particles which passed through a 160-mesh screen. Separately, a white chocolate base was prepared through a conventional process of mixing 26 parts of cocoa butter, 25 parts of powdered whole milk, 37 parts of sugar, 0.5 parts of lecithin and a trace amount of $\beta$-carotin which was employed as a coloring agent. Then 12 parts of the aforementioned fine particles of candied orange were added to and mixed with 88.5 parts of the white chocolate base, with the addition of an orange flavoring to provide the aroma of orange to the product, to prepare an orange chocolate paste in which the candied orange particles were uniformly dispersed. This paste could be molded into desired shapes of orange chocolate products.

Also, an orange chocolate containing orange peel was manufactured by adding 15 parts of candied orange peel, which had been moderately crushed, to 85 parts of the orange chocolate paste of this example.

EXAMPLE 2

A chocolate base was prepared by mixing 26 parts of cacao mass, 18 parts of cocoa butter, 41 parts of sugar and 0.5 parts of lecithin and further adding a trace amount of orange flavoring to provide the aroma of orange. An orange chocolate paste was prepared by mixing 15 parts of the fine particles of candied orange produced in Example 1 with 85.5 parts of the chocolate base prepared in this example. This orange chocolate paste could be shaped into various orange chocolate products.

EXAMPLE 3

An apple chocolate paste was obtained by mixing 75 parts of dried apple, 15 parts of cacao mass and 10 parts of almond paste, freezing the resultant mixture and pulverizing the frozen mixture so that the particles passed a 160 mesh screen. Then an apple chocolate paste was prepared by mixing 35 parts of the finely pulverized dried apple with a "sucroseless" chocolate base which had been prepared by mixing 10 parts of cacao mass, 20 parts of cocoa butter, 10 parts of anhydrous glucose, 5 parts of fructose and small amounts of lecithin and apple flavoring. This apple chocolate paste could be molded into apple chocolate products.

Also, an apple chocolate containing cashew nuts was produced by adding 30 parts of crushed cashew nuts to 70 parts of the apple chocolate paste prepared above and subjecting the resultant nut-containing paste to a conventional molding process.

EXAMPLE 4

A mixture of 5 parts of prune and 45 parts of raisins was frozen together with 38 parts of cacao nibs, 11 parts of roasted almond and 1 part of lecithin and pulverized in the frozen state into fine particles which passed through a 100-mesh screen. Then 35 parts of the thus obtained fine particles were uniformly dispersed in a diet chocolate base which had been prepared by mixing 8 parts of cacao mass, 21 parts of cocoa butter, 20 parts of sorbitol, 16 parts of powdered whole milk, 0.5 parts of lecithin and a very small amount of vanillin to prepare a fruit-containing diet chocolate paste, which could be molded into fruit-containing diet chocolate products.

By coating the entire surface of roasted almond with this fruit-containing diet chocolate paste, it was possible to produce a diet chocolate in the form of an almond chocolate ball.

EXAMPLE 5

A mixture of 60 parts of dried dates and 10 parts of raisins was frozen together with 30 parts of cacao mass and pulverized in the frozen state into fine particles. A fruit-containing chocolate paste was prepared by uniformly dispersing 45 parts of the thus obtained fine particles in a chocolate base which has been prepared by mixing 2 parts of cacao mass, 25 parts of cocoa butter, 25 parts of powdered whole milk, 3 parts of powdered skim milk, 0.5 parts of lecithin and a small amount of natural vanilla flavoring. Obtained through shaping of this fruit-containing chocolate paste were fruit-containing chocolate products which were natural food, i.e. they contained neither refined sugar nor any sugar substitute yet which possessed a good and sufficiently strong sweetness of fruits.

What is claimed is:

1. A method of preparing a fruit-containing chocolate product comprising:
   (a) mixing one or more dehydrated fruits selected from the group consisting of dried fruits and candied fruits with one or more edible fatty substances selected from the group consisting of oil, fats, almonds, cocoa beans, cashew nuts, hazel nuts, peanuts and pasty foodstuffs prepared by grinding one or more of them, wherein the mixture contains at least 10% by weight of oil or fat;
   (b) freezing the resulting mixture at a temperature such that the frozen mixture can be pulverized;
   (c) pulverizing the frozen mixture into fine particles;
   (d) uniformly dispersing the thawed fine particles into a chocolate base to form a paste; and
   (e) forming said paste into chocolate product.

2. The method of claim 1, wherein said chocolate base is substantially free of refined sugar.

3. The method of claim 2, wherein said chocolate base contains no supplemental sweetening agents.

4. The method of claim 1, wherein said edible fatty substance comprises butter fat.

5. The method of claim 1, wherein the water content of said dehydrated fruit is not greater than about 35% by weight.

6. The method of claim 1, wherein the mixture in step (b) is frozen at a temperature below about −25° C.

7. The method of claim 1, wherein the particles produced in step (c) are sufficiently fine so that all will pass a 100 mesh screen.

8. The method of claim 1, wherein the amount of fine particles added to said chocolate base is not greater than about 50% by weight of the resulting chocolate paste.

9. The method of claim 8, wherein the amount of fine particles added to said chocolate base is not less than about 5% by weight calculated on the basis of the weight of the fruit in the raw state.

10. The method of claim 1, wherein said chocolate paste additionally contains small pieces of one more foodstuffs.

11. The method of claim 1, wherein said chocolate paste is formed into a chocolate product by coating a center.

* * * * *